United States Patent [19]

Baritz

[11] Patent Number: 5,031,262
[45] Date of Patent: Jul. 16, 1991

[54] METHOD OF MAKING A NON-PERFORATED NAIL BUTTON

[75] Inventor: Lenard Baritz, Highland Park, Ill.

[73] Assignee: Handy Button Machine Company, Melrose Park, Ill.

[21] Appl. No.: 480,945

[22] Filed: Feb. 16, 1990

Related U.S. Application Data

[62] Division of Ser. No. 398,422, Aug. 25, 1989, Pat. No. 4,943,197.

[51] Int. Cl.$^5$ .............................................. B21G 5/00
[52] U.S. Cl. .......................................... 10/161; 29/505
[58] Field of Search ............... 10/DIG. 4, 27 R, 28, 10/34, 54, 63, 71, 161, 156; 29/505, 521; 411/373, 375, 396, 480, 481

[56] References Cited

U.S. PATENT DOCUMENTS

| | | | |
|---|---|---|---|
| 330,995 | 11/1885 | McGill | 411/480 X |
| 335,846 | 2/1886 | Smith et al. | 411/396 X |
| 590,768 | 9/1897 | Neider | 411/480 X |
| 1,865,756 | 7/1932 | Henry | 411/480 |
| 2,028,703 | 1/1936 | Hatch | 411/480 X |
| 2,072,837 | 3/1937 | Helm | 411/481 |
| 2,140,749 | 12/1938 | Kaplan | 10/54 X |

FOREIGN PATENT DOCUMENTS

| | | | |
|---|---|---|---|
| 382120 | 9/1923 | Fed. Rep. of Germany | 411/480 |
| 224886 | 3/1925 | United Kingdom | 10/54 |

Primary Examiner—E. Michael Combs
Attorney, Agent, or Firm—Allegretti & Witcoff, Ltd.

[57] ABSTRACT

A nail button and a method for manufacturing the nail button are disclosed. The nail button consists of a button cap and a base. The base comprises a collet and an attaching means associated with the collet. The collet is characterized in that it is not perforated and in that it comprises a lipped recess in the collet for joining the attaching means to the collet.

2 Claims, 1 Drawing Sheet

U.S. Patent          July 16, 1991          5,031,262
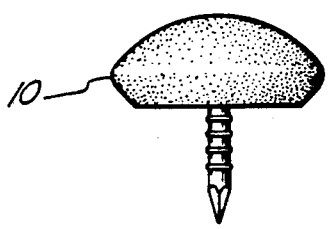
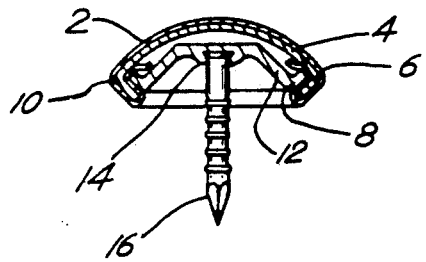
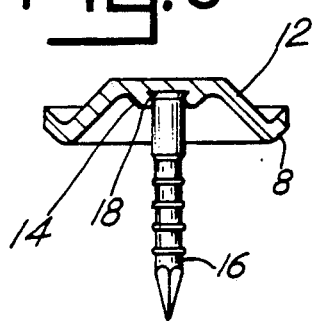
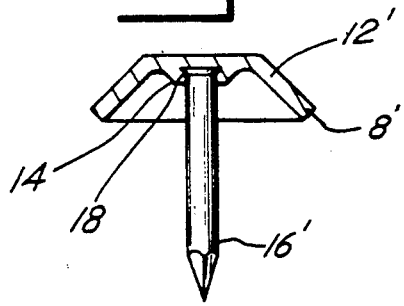
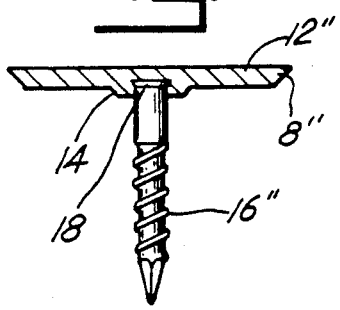
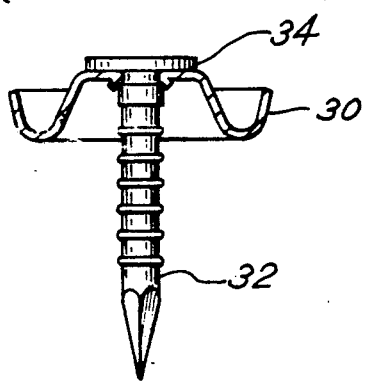
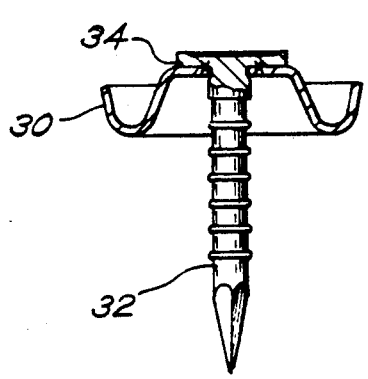

METHOD OF MAKING A NON-PERFORATED NAIL BUTTON

CROSS-REFERENCE TO RELATED APPLICATION

This application is a Divisional application of prior co-pending application Ser. No. 398,422 filed Aug. 25, 1989, U.S. Pat. No. 4,943,197.

BACKGROUND OF THE INVENTION

This invention is related to a nail button and a method for manufacturing a nail button. More specifically, this invention involves a nail button which comprises a non-perforated collet.

Covered nail buttons are used for functional and non-functional purposes in the furniture industry. Typically, these nail buttons have been made using one of two different methods to form a nail button base assembly comprising a collet and attaching means. The first method used in the industry for joining the attaching means and the collet is by staking. Staking simply means that the attaching means, usually a headed nail, is driven through a hole in the center of the collet. The nail becomes lodged in the hole following the staking operation through friction fit or interference fit.

The second method of joining the attaching means to the collet is by spot welding. In the spot welding method, a nail type attaching means with a broad head is inserted into a hole in the collet which is held in a die. The attaching means is them attached to the collet by spot welding.

These two methods have been successfully used for many years to produce perforated nail buttons for industry. However, these methods are not without drawbacks. One primary drawback of these methods lies in the number of steps required to produce the button base assembly comprising the collet and attaching means. A second drawback is the speed in which the nail button can be assembled by the two methods above. An additional disadvantage lies in the quality of the nail button produced by the two methods above. Quite often the spot welding or staking procedure results in a nail button in which the nail is not fully attached to the collet or which becomes loose upon use. This results in a nail button that must be discarded or replaced.

SUMMARY OF THE INVENTION

It is an object of this invention to provide a nail button and a method for manufacturing a nail button which utilizes fewer steps in its manufacture than are required by prior art nail buttons.

It is a further object of this invention to provide a method for producing a nail button which may be operated at higher production rates than prior art nail button production methods, thus reducing the costs associated with producing the nail buttons.

It is still a further object of this invention to provide a method for manufacturing a nail button which results in a marked improvement in the overall number of acceptable nail buttons produced by the method.

Accordingly, a broad embodiment of this invention is a nail button base assembly consisting of a collet joined to an attaching means. The collet portion of the base assembly is characterized in that it is non-perforated.

In another embodiment, the nail button of this invention consists of a button cap and a base assembly. The base assembly consists of a collet joined to an attaching means. The nail button is characterized in that the collet is non-perforated and comprises a lipped recess for joining the attaching means to the collet.

It is also an object of this invention to provide a method for manufacturing a nail button. The method comprises the steps of inserting the end of an attaching means into a lipped recess located essentially in the middle of one side of a non-perforated metal collet. The non-perforated metal collet with the attaching means inserted into the lipped recess is formed so that the lip of the lipped recess retains the end of the attaching means in the recess. Finally, a button cap is attached to the side of a non-perforated collet opposite that of the lipped recess.

A preferred method for manufacturing a nail button having a non-perforated collet comprises forming a circular metal blank to produce a collet having a hemispherical center portion containing a lipped recess, and a flat peripheral edge. The outwardly tapered flat end of a nail or screw is next inserted into the lipped recess. The collet comprising the attaching means inserted into the lipped recess is formed so that the lip of the lipped recess retains the outwardly tapered flat end of the attaching means in the recess. This forming step also shapes the peripheral edge of the collet so that it slants upwardly and outwardly and is capable of accepting the button cap. Finally, the button cap is attached to the side of the collet opposite that which retains the attaching means.

BRIEF DESCRIPTION OF THE DRAWINGS

There is shown in the attached drawing a presently preferred embodiment of the present invention, wherein like numerals in the various views refer to like elements and wherein:

FIG. 1 shows an assembled nail button of this invention.

FIG. 2 shows a cross-sectional view of the assembled nail button of this invention.

FIGS. 3, 3a and 3b show cross-section views of various embodiments of assembled nail button base assemblies.

FIG. 4 represents a cross-sectional view of a nail button base assembly prepared by the prior art staking method.

FIG. 5 represents a cross-sectional view of a nail button base assembly prepared by the prior art spot welding method.

DETAILED DESCRIPTION OF THE INVENTION

The present invention is a nail button and a method of manufacturing the nail button.

FIGS. 4 and 5 represent prior art base assemblies for nail buttons. The staked nail button base assembly is shown in FIG. 4. The spot welded nail button base assembly is shown in FIG. 5. Both prior art base assemblies consist of a perforated collet 30 and an attaching means 32 passing through the perforation in the collet. The attaching means 32 is retained in the collet 30 partly due to a flat head end 34 of the attaching means 32 which cannot pass through the perforation in the collet 30.

The nail button of this invention is better understood by references to FIGS. 1-2 and 3, 3a and 3b. Referring to FIGS. 1 and 2, the nail button assembly 10 comprises a decorative material 2 covering a metal cap 4 to form a button cap. The button cap has an inward and downward slanting edge 6. The inward and downward slanting edge 6 of the button cap encompasses the upwardly and outwardly slanting peripheral edge 8 of a non-perforated collet 12 to form a nail button assembly 10. The non-perforated collet 12 comprises a lipped recess 14 which joins the attaching means 16 to the non-perforated collet 12. The decorative material 2 is retained in place over the metal cap 4 by virtue of its being held between the upwardly and outwardly slanting peripheral edge 8 of the non-perforated collet 12, and the inward and downward slanting edge 6 of the button cap of the assembled nail button 10.

FIG. 3 is a cross-section view of the preferred base assembly of this invention, while FIGS. 3a and 3b are cross-section views of alternative collet embodiments of the nail button of this invention. FIGS. 3, 3a and 3b are not to be interpreted to be the only embodiments of nail button base assemblies of this invention. Various changes can be made to the nail button base assemblies shown in the Figures without departing from the invention. Referring to FIG. 3, the base assembly comprises an attaching means 16 joined to a non-perforated collet 12. The attaching means 16 has a outwardly tapered end 18. The outwardly tapered end 18 of the attaching means 16 has been inserted into a lipped recess 14 in the non-perforated collet 12. The lipped recess 14 is formed so that it seals the outwardly tapered end 18 of the attaching means 16 in the lipped recess 14 of the non-perforated collet 12. The non-perforated collet 12 also comprises upwardly and outwardly slanting peripheral edge 8, useful as a site to which the button cap may become attached.

With reference to FIGS. 3a and 3b, there are shown alternatives for the collet 12 of FIG. 3. The collet 12' of FIG. 3a is like that of FIG. 3. However, the peripheral edge 8 of the collet 12 of FIG. 3 is omitted. The peripheral edge 8' is at an angle with respect to the generally planar top of the collet 12' and to the axis of the attaching means 16'. The peripheral edge 8' is constructed and arranged to facilitate the affixing of a button cap to the collet, if desired. The means for affixing the attaching means 16 to collet 12' is the same as shown and described with respect to FIG. 3.

In FIG. 3b there is shown another embodiment of collet 12 of FIG. 3. Collet 12" is generally a flat disc that is secured to attaching means 16 in the same manner as shown in FIG. 3. The peripheral edge 8" is at an angle with respect to the top of the collet 12" and the axis of the attaching means 16". This construction facilitates the affixing of a button cap to the collet, if desired. The angle of peripheral edge 8" is about 45° with respect to the horizontal.

The nail button of this invention is assembled from a button cap and a base assembly. The button cap is typically a metal cap. The metal cap is usually domed-shaped. It is the button cap which an observer sees when the nail button is installed. For this reason, it is preferred but not necessary that the button cap is covered by a decorative material.

The decorative material covering the preferred metal domed-shaped button cap may be any material having aesthetic value to an observer. Decorative materials might include for example, fabrics, leather, plastic sheeting, fur, paint, varnish, and other similar materials capable of decoratively covering the metal button cap.

It should be noted that the button cap used herein is essentially the same button cap that is used as a piece of the nail buttons made utilizing the spot welding or staking processes of the prior art. Therefore, while the button cap is not an inventive aspect of the instant nail button, it is still an important element of the commercial nail button assembly. Any button cap known in the art capable of being adapted to be attached to the base assembly of the instant nail button falls within the scope of this invention.

The primary element of the nail button of this invention is the base assembly. The base assembly further comprises an attaching means and a collet. The attaching means and collet are joined to form the base assembly.

The attaching means is designed to enable the nail button to be attached to the item it is to decorate. The attaching means will typically be an elongated rod-shaped piece of metal that is preferably pointed on one end so that it may ultimately penetrate items such as wood, cloth and the like that the nail button will decorate.

As the term "nail button" infers, the attaching means is preferably a threaded metal nail or a corrugated metal nail. However, the attaching means may be a screw, or any other known means capable of attaching the nail button to an object.

The end of the attaching means opposite that of the pointed end may generally take on any shape. However, the shape chosen must enable the attaching means to be retained in the lipped recess of the non-perforated collet. Therefore, it is preferred that the end of the attaching means opposite the pointed end is essentially flat. This end of the attaching means will be referred to hereinafter as the flat end. The flat end allows the attaching means to be placed in the lipped recess of the non-perforated collet such that the attaching means is generally perpendicular in relation to the collet. The collet of the nail button acts like the head of a nail. If the end of the attaching means is not flat, then the attaching means might not be joined to the collet in a perpendicular relationship. This would make the installation of the nail button difficult as the nail button would behave like a bent nail.

It is also preferred that the attaching means have a slight outward taper in the region of the flat end. The outward taper facilitates the retention of the attaching means in the lipped recess. During the manufacturing of the instant nail button, the collet is formed to create a lipped recess complementary to the end of the attaching means for retaining the flat end of an attaching means having an outward taper in the region of the flat end. Once the outwardly tapered flat end of the attaching means is located within the lipped recess of the collet, the assembly is formed a second time to collapse the lips of the lipped recess around the sides of the attaching means. Because of its outward taper, the flat end of the attaching means is now larger in diameter than the opening of the recess as defined by the collapsed lips of the lipped recess. This difference in diameters ensures that the attaching means will not slip out of the lipped recess or become loose during use.

The collet is the heart of the nail button of this invention. The collet of the instant nail button has two functions. First it provides a stable site to which the attaching means is located. Second, the collet provides a seat to which the button cap is attached.

As previously mentioned, the collet of this invention is characterized in that it is non-perforated. That is to say the collet comprises a recess, but the recess does not extend completely through the collet to form a hole or perforation as required of the prior art button cap collets made by either staking or spot welding methods. This aspect of the collet allows the base assembly of the instant nail button to be manufactured on high speed making equipment. This method of manufacturing the base results in a higher base production rate with improved base quality control.

In a preferred method for manufacturing, the collet begins its existence as a round metal blank. The blank is formed, for example by coining, in a first forming step to produce an intermediate collet which comprises a hemispherical center portion with a lipped recess underneath the hemispherical center portion, and a flat peripheral edge. At this point the outwardly tapered flat end of an attaching means is inserted into the lipped recess. The intermediate collet is next subjected to a second forming step. In the second forming step, three collet modifications may occur. First the lip of the lipped recess must be collapsed around the outer dimension of the attaching means. Second, the hemispherical center portion of the collet may be flattened. Finally, the peripheral edge of the collet may be slanted upward with an outward slope. It is preferred that all three collet modifications occur during the second forming step. This would minimize at two the number of steps required to make the instant nail button base. Alternatively, the first and second collet modifications could occur during the second forming step with the final collet modification occurring during a third forming step, or even during the first forming step.

The base assembly, produced as described above, has an attaching means firmly joined to the collet. The peripheral edge of the collet has also been modified to provide a site at which the button cap may be united to the base during nail button assembly. The modification of the collet peripheral edge may take on any form known which allows two pieces of metal to be united. Generally, the button cap will be slightly wider in diameter than the collet. This allows the button cap to be united with the collet.

The peripheral edge of the collet is preferably sloped upwardly and outwardly to provide a site at which the collet can unite with the button cap peripheral edge which preferably has a downward and inward projecting sidewall in assembled relationship. The button cap is united with the collet to cover the side of the collet opposite the side containing the attaching means. The nail button is fully assembled once the downward projecting sidewall of the button cap is inwardly united with the upwardly and outwardly slanting peripheral edge of the collet portion of the base.

The final assembly step of the instant nail button typically comprises uniting the button cap and the base. This is preferably accomplished by designing the collet peripheral edge and button peripheral cap edge so that they can be united by a die. It is further preferred that the decorative material is secured to the button cap during this final assembly step.

The button cap, with or without a decorative material covering, may be united with the collet portion of the base assembly to produce a nail button by any means known in the art, including by hand, by automatic machinery, and by manual machinery. It is preferred that the button cap of the nail button have a decorative material covering, and it is also preferred that the nail button be manufactured in an automated machine comprising an upper and bottom die cooperative with one another.

To assemble a nail button covered by a decorative fabric using the preferred automated method, a decorative material is placed over the button cap in an upper die. The decorative material is wrapped into the button cap by die action as the top post of the upper die moves down within the upper die collar towards the bottom die. The bottom die serves two functions. First, it curls the decorative material inward so that it becomes trapped between the collet and button cap. Second, the bottom die is tapered outwards to force the vertical walls of the button cap to become projected inwards and downwards around the upwardly and outwardly slanting wall of the collet. The shaping of the outer wall of the button cap occurs as the button cap is forced by the top post of the upper die towards the collet held by the bottom die as a result of the downward movement of the upper die. This final button cap wall shaping action succeeds in securing the button cap to the collet to create the nail button product.

While a presently preferred embodiment of the invention has been shown and described, it is apparent that various changes and modifications may be made therein without departing from the invention. Therefore, it is intended in the appended claims to cover all changes and modifications as fall within the true spirit and scope of the invention.

What is claimed is:

1. A method for manufacturing a nail button having a base assembly and a button cap having vertical walls consisting of the steps of:
    a. forming a circular metal blank into a collet having a hemispherical center portion containing a lipped recess, and a flat peripheral edge;
    b. inserting an outwardly tapered flat end of a nail or screw into the lipped recess of the collet;
    c. deforming the collet of step (b) by collapsing the lip of the lipped recess around said tapered flat end of said nail or screw so that the lip retains the outwardly tapered flat end of the nail or screw in the recess, while simultaneously shaping the periphery of the collet to form an upwardly and outwardly slanting peripheral edge thereon; and
    d. uniting the button cap having vertical walls with the collet in a die by forcing the vertical walls of the button cap to become projected inwards and downwards around the upwardly and outwardly slanting edge of the collet.

2. The method of claim 1 further comprising covering the button cap by securing a decorative fabric into place between the collet and the button cap during uniting step (d).

* * * * *